J. T. FERRES.
MACHINE FOR MAKING PACKAGE WRAPPERS.
APPLICATION FILED JAN. 19, 1914.

1,121,817.

Patented Dec. 22, 1914.
6 SHEETS—SHEET 1.

Inventor:
Jeffrey T. Ferres.

J. T. FERRES.
MACHINE FOR MAKING PACKAGE WRAPPERS.
APPLICATION FILED JAN. 19, 1914.

1,121,817.

Patented Dec. 22, 1914.
6 SHEETS—SHEET 3.

Witnesses:

Inventor:
Jeffrey T. Ferres.

UNITED STATES PATENT OFFICE.

JEFFREY T. FERRES, OF LOS ANGELES, CALIFORNIA.

MACHINE FOR MAKING PACKAGE-WRAPPERS.

1,121,817.      Specification of Letters Patent.      Patented Dec. 22, 1914.

Application filed January 19, 1914. Serial No. 812,871.

*To all whom it may concern:*

Be it known that I, JEFFREY T. FERRES, a citizen of the United States, residing at Los Angeles, in the county of Los Angeles and State of California, have invented a new and useful Machine for Making Package-Wrappers, of which the following is a specification.

This invention relates to a machine for making package wrappers and is especially adapted for making wrappers for bottles.

One of the wrappers which the machine makes consists of a sheet of corrugated paper with a sheet of plain paper pasted to one side of it to hold the corrugations from flattening out, and with a fly sheet secured to one end of the backing of the corrugated sheet for a narrow space, while the rest of the fly sheet is free to enable the corrugated sheet with the backing sheet to be rolled around the bottle so that the fly sheet may be pulled snugly around the rolled up corrugated sheet to form a smooth outer covering, and in order to make a perfect inclosure of the package, the fly sheet has a greater width and length than the corrugated sheet, so that the extra projecting portions at the ends of the fly sheet may be tucked in to close the ends of the package, while the projecting side portion may be gummed if desired to enable it to be stuck down to the package. Such wrappers have heretofore been constructed by hand, that is to say, that portion of the wrapper consisting of the corrugated sheet and backing sheet are a well known machine product and have been on the market for several years, but it has been necessary to apply the fly sheet to this product by hand, and the main object of the present invention is to provide a machine for constructing the complete wrapper, including the attaching of the fly sheet. The machine constructs and assembles all the elements of the wrapper. In other words, the machine does not act to merely apply a fly sheet to the single faced corrugated sheet, but constructs all elements of the package and combines them properly together.

In a previous application of mine filed December 11th, 1913, Serial No. 805,878, I have shown a novel form of wrapper in which the fly sheet is applied directly to the corrugated sheet in such a manner as to dispense entirely with the backing sheet which has heretofore been used, and a further object of the present invention is to construct a wrapper such as shown in the former application referred to, as well as to construct the first mentioned style of wrapper.

Referring to the drawings.

Figure 13:
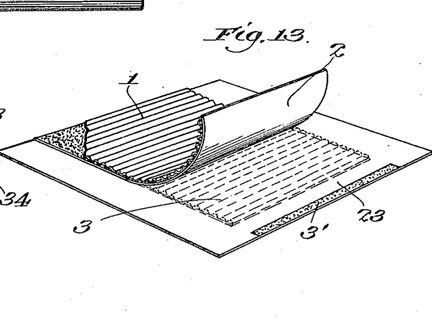
Fig. 13 is a perspective in detail of one of the complete wrappers as constructed by the machine, in which a backing sheet is employed.

In constructing the form of wrapper shown in Fig. 13, three elements are employed, a corrugated sheet 1, a backing sheet 2, and a fly sheet 3, with a gummed edge 3'. The sheet 1 for convenience, is herein referred to as the corrugated sheet, although it is not corrugated until it passes into the machine. The sheet 1 is supplied from a roll 4 which is mounted to rotate in fixed bearings 5. From the roll 4 the sheet 1 passes under a guide roll 6 which is carried by a frame 7 pivoted at 8 and having a counter-weight 9.

10 designates a bracket against which the frame 7 normally rests, being held thereagainst by a coil spring 11.

Figure 5:
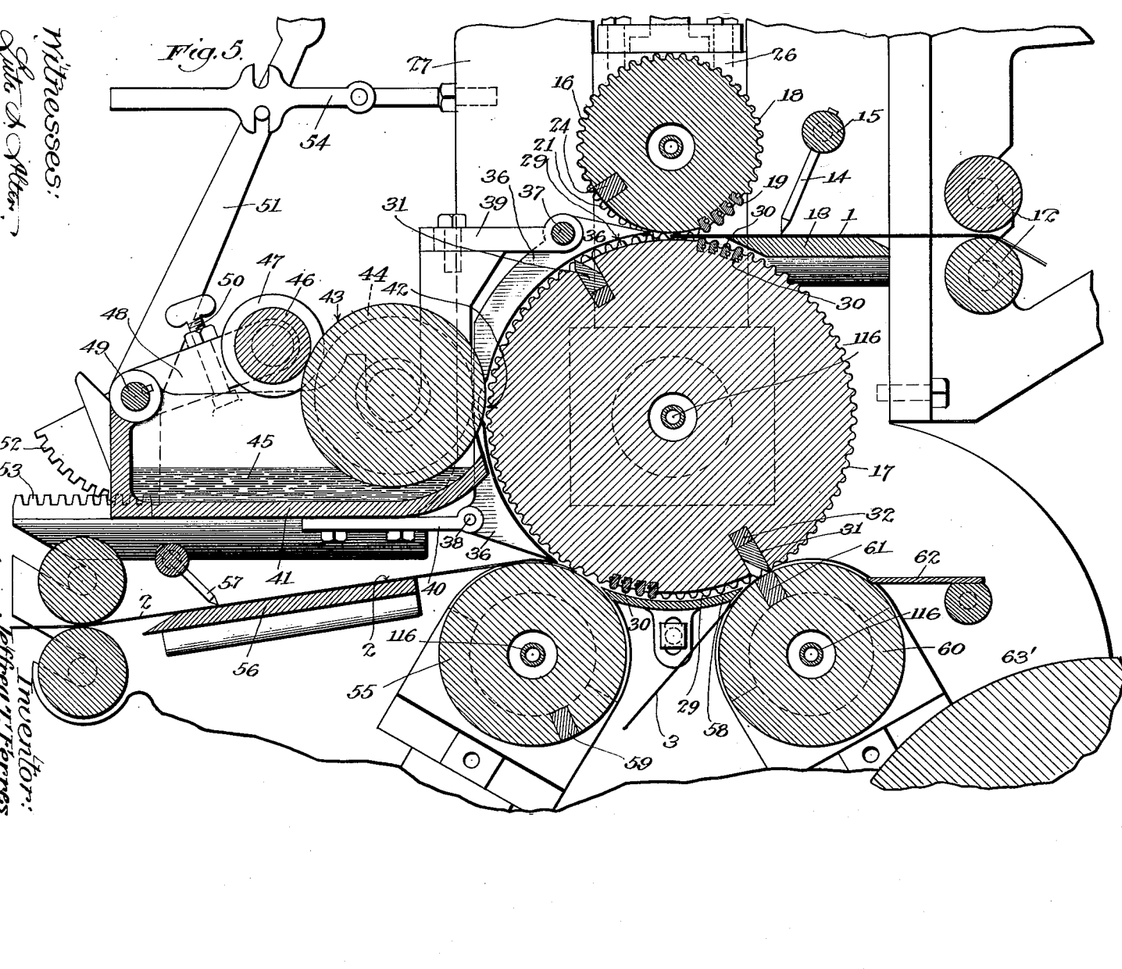
Fig. 5 is a view on the same section as Fig. 3, showing a portion of the machine on an enlarged scale.
Figure 6:
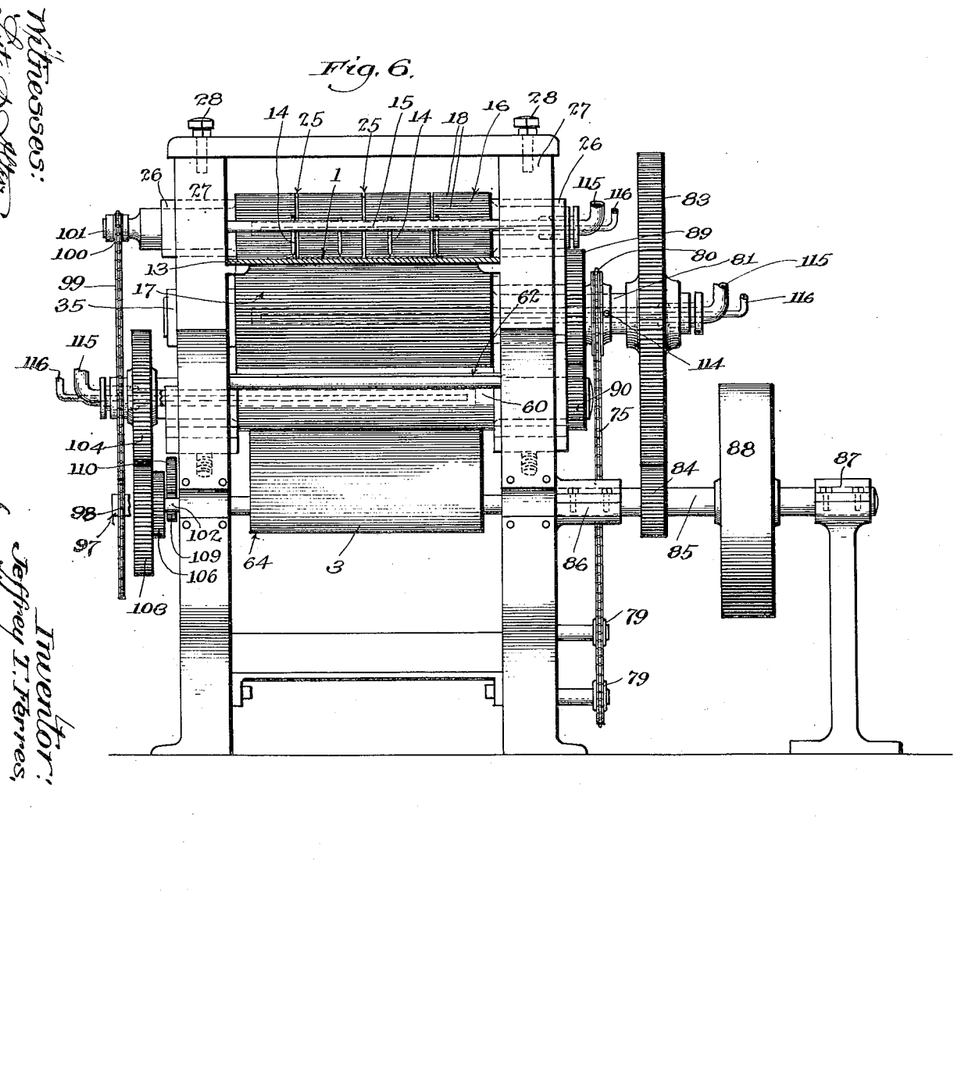
Fig. 6 is an end view of the machine, with the bracket and its attachment including the roll of paper to be corrugated, also the drying belt, and air pipe removed.
Figures 7, 8, 9, 12:
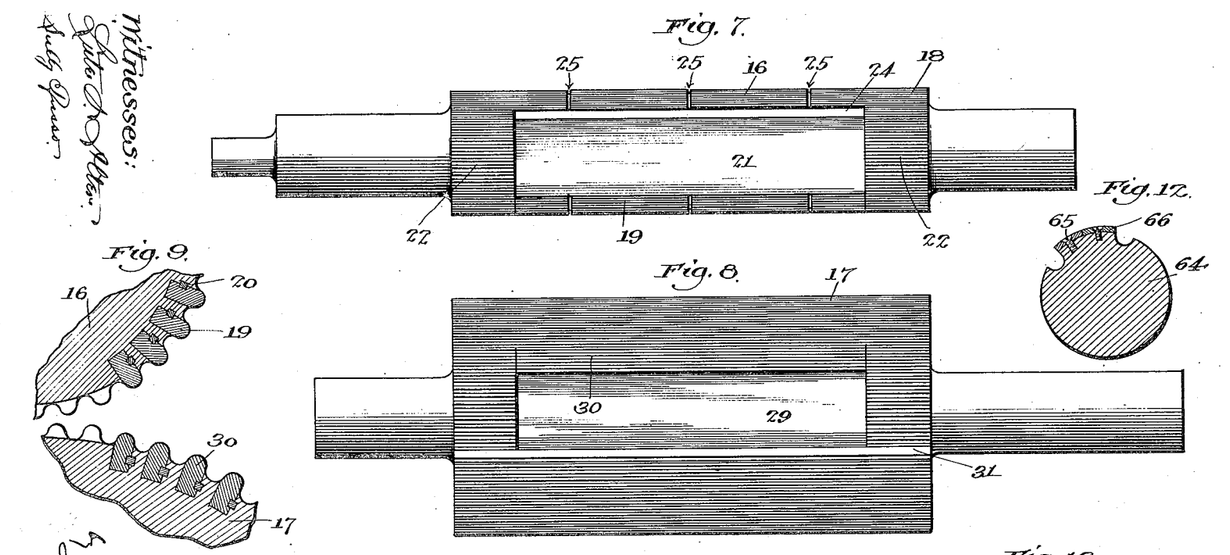
Fig. 7 is a plan view of the upper corrugating roll.
Fig. 8 is a plan view of the lower corrugating roll.
Fig. 9 is a transverse section through adjacent portions of the upper and lower corrugating rolls.
Fig. 12 is a transverse section through the gum roller.

The sheet 1 is drawn intermittently from the roll 4, as will be hereinafter shown, and in order to prevent tearing of the paper when it is fed, the frame 7 is constructed as described, so as to yield upwardly. From the roller 6 the sheet 1 passes between guides 12 and thence over a stationary plate 13 and under check points 14, which comprise a series of pointed rods which project down from a journaled cross bar 15, so that the weight of the check points 14 will hold them against the paper with a slight pressure sufficient to cause the points to engage the paper and prevent it from flying back at this point when the strip of paper is severed in a manner to be described. From the check points 14 the strip 1 passes between an upper corrugating roller 16 and a lower corrugating roll 17. These rolls are shown in detail in Figs. 5, 7 and 8. The upper roll 16 is herein shown as exactly one-half the diameter of the lower corrugating roll, although it should be understood that its circumference as well as that of the lower corrugating roll and plain rolls 55 and 60 to be later described, may be any other multiple of the length of the fly sheet which is to be used. The corrugating roll 16 is provided around a portion of its periphery with a series of continuous teeth 18 and with a series of removable teeth 19. The removable teeth 19 are secured by keys 20 which extend through suitable openings formed for them. The roll also has part of its teeth cut away to form a blank portion 21, the length of which is less than the length of the roll, thereby leaving a series of short teeth 22 at each end. This blank space 21 covers but a small area of the roll, but its dimensions have a definite relation to the wrapper. The length of the blank space 21 is equal to or a trifle greater than the length of the corrugated sheet 1 and the backing sheet 2, and its width is equal substantially to the marginal portion 23, see Fig. 13, of the fly sheet which projects beyond the side edge of the backing sheet 2 and corrugated sheet 1.

In one side of the blank space 21 is inserted an anvil 24 of hardened steel, and the roll 16 is provided with a series of circumferential grooves 25, the depth of which extends to the top surface of the anvil 24. The roll 16 is mounted in bearings 26 which are vertically slidable in the side frame 27 of the machine and may be adjusted by screws 28, the roll 16 being driven by reason of its engagement with the lower corrugating roll 17.

Figure 10:
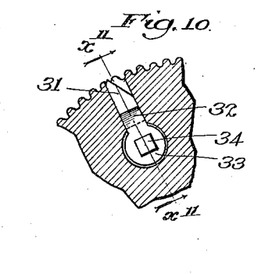
Fig. 10 is a transverse section through a portion of the lower corrugating roll, on line $x^{10}$—$x^{10}$, Fig. 11, showing the knife.
Figure 11:
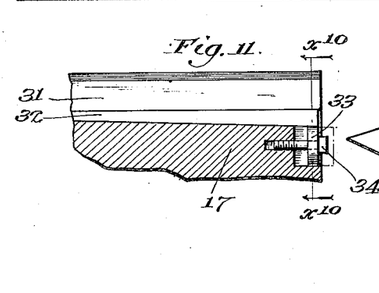
Fig. 11 is a sectional view though a portion of the lower corrugating roll on line $x^{11}$—$x^{11}$, Fig. 10.

The lower corrugating roll 17 is similar in general construction to the upper roll, but is provided with two blank spaces 29 which are diametrically opposite each other, and with two sets of removable teeth 30 which are also diametrically opposite and it is provided with two diametrically opposite knives 31 shown in detail in Figs. 10 and 11, each knife being received in a radial recess with a longitudinal wedge 32 underneath it, the lower wall of the recess being inclined to accommodate the wedge as shown in Fig. 11, and each wedge 32 has a lug 33 through which a bolt 34 extends into the body of the roller 17 and by means of which the wedge 32 may be moved in one direction or the other to vary the position of the knife 31, which should be so adjusted that it will have perfect contact with the anvil 24 of the upper roll, when in conjunction therewith in order to properly cut the paper, as will be described.

The lower roll being twice the size of the upper one, makes one revolution while the upper roll makes two revolutions. The lower corrugating roll 17 is journaled in fixed bearings 35 in frame 27.

The sheet 1 is drawn along by the engagement therewith of the teeth of the upper and lower corrugating rolls meshing together, which action also corrugates the sheet 1. This forward motion of sheet 1 continues only for a portion of the circumference of the roll 16, at which time one of the knives 31 of the lower roll comes into contact with the anvil 24 and cuts the strip through, and further movement of the rolls brings the blank spaces 21 and 29 into register with each other and there is then nothing to engage the sheet 1 to cause its further advance, so that during this time the sheet 1 remains stationary with the check points 14 holding it from flying back or shifting. Continued rotation of the corrugating rolls brings the teeth which succeed the blank spaces into meshing engagement with each other, and with the sheet 1, and then cause the sheet 1 to again advance.

The sheet 1 having been corrugated between the corrugating rolls, passes underneath a series of guides 36, the upper front points of which project into the grooves 25 of the upper corrugating roll, the guides 36 being supported at their upper ends on a rod 37, and at their lower ends by a rod 38 which rods are respectively mounted in adjustable brackets 39 and 40, secured to an adhesive container 41. The guides 36 have concave portions 42 which permit the corrugated sheet to spring outwardly at this point a slight distance from its intimate engagement with the teeth of the lower corrugating roll, the remaining portions of the guides 36 holding the remaining portion of the sheet 1 in intimate engagement with the teeth of the lower corrugating roll, so that as each portion of the corrugated sheet arrives at the concave portions 42 it springs slightly away from the lower corrugating roll and comes into contact with an adhesive roll 43 which supplies an adhesive to the projecting portions of the corrugations of the sheet 1. The adhesive roll 43 is provided with grooves 44 to receive the guides 36 and it revolves in adhesive 45 in container 41. In order to perfectly distribute the adhesive over the adhesive roll 43, I provide a gage roll 46 which is driven by a positive gearing to be later described, at a speed such that there is a definite slip between the surfaces of the gage roll 46 and adhesive roll 43 and this slipping of the surfaces causes the adhesive to be smoothly distributed on the surface of the roll 43. Were the gage roll 46 to revolve at a speed such that there were no slip, the adhesive would lie in uneven blotches on adhesive roll 43. The gage roll 46 also carries some loose rings 47 which travel in the grooves 44 of the adhesive roll and these rings serve to clean out the grooves 44 of adhesive and prevent adhesive from being carried around the roll into contact with the guides. The gage roll 46 is journaled in a bracket 48 which is pivoted on a shaft 49 and may be adjusted by two screws 50. Keyed to the shaft 49 is a lever 51 having a segmental gear 52 which meshes with a stationary rack 53 so that by swinging the lever 51 the adhesive container 41, together with the elements carried thereby may be moved toward or from the corrugating roll 17. The lever 51 may be detachably engaged by a pivoted notched bar 54. The corrugated sheet after being supplied with adhesive passes along the remaining surface of the guides 36 and over a presser roll 55. The backing sheet 2, (see Fig. 5) passes over a stationary plate 56 underneath check points 57, and over the presser roll 55 and into contact with the projecting gummed portions of the corrugated sheet, and is firmly pressed into contact therewith by the presser roll 55, thereby securing the backing sheet to the corrugated sheet as they are drawn along. The backing sheet and corrugated sheet are carried along together over a curved plate 58 and when the knife heretofore referred to which had formerly severed the corrugated sheet, comes into contact with the backing sheet 2, it acts also to sever it, at the same point at which the corrugated sheet was severed, so that the two edges of these two sheets are exactly together and in line, the knife 31 at this point coming into contact with an anvil 59 in the presser roll 55. The corrugated sheet with its attached backing sheet continues to travel, being moved by the lower corrugating roll 17, and passes over another presser roll 60. The fly sheet 3 also passes over the roll 60 and although in contact with the backing of the corrugated sheet, does not adhere thereto for the greater portion of its contact therewith until a gummed portion of the fly sheet 3 is encountered at which time the fly sheet being firmly pressed against it by the presser roll 60, is caused to adhere thereto and after a further short distance of travel, the same knife which has previously severed sheets 1 and 2, reaches the sheet 3 and severs it against an anvil 61 in presser roll 60, and the completed wrapper is discharged onto a narrow plate 62 and from thence falls onto a drying belt 63, which runs over a drum 63', see Fig. 3.

Figures 3, 4:
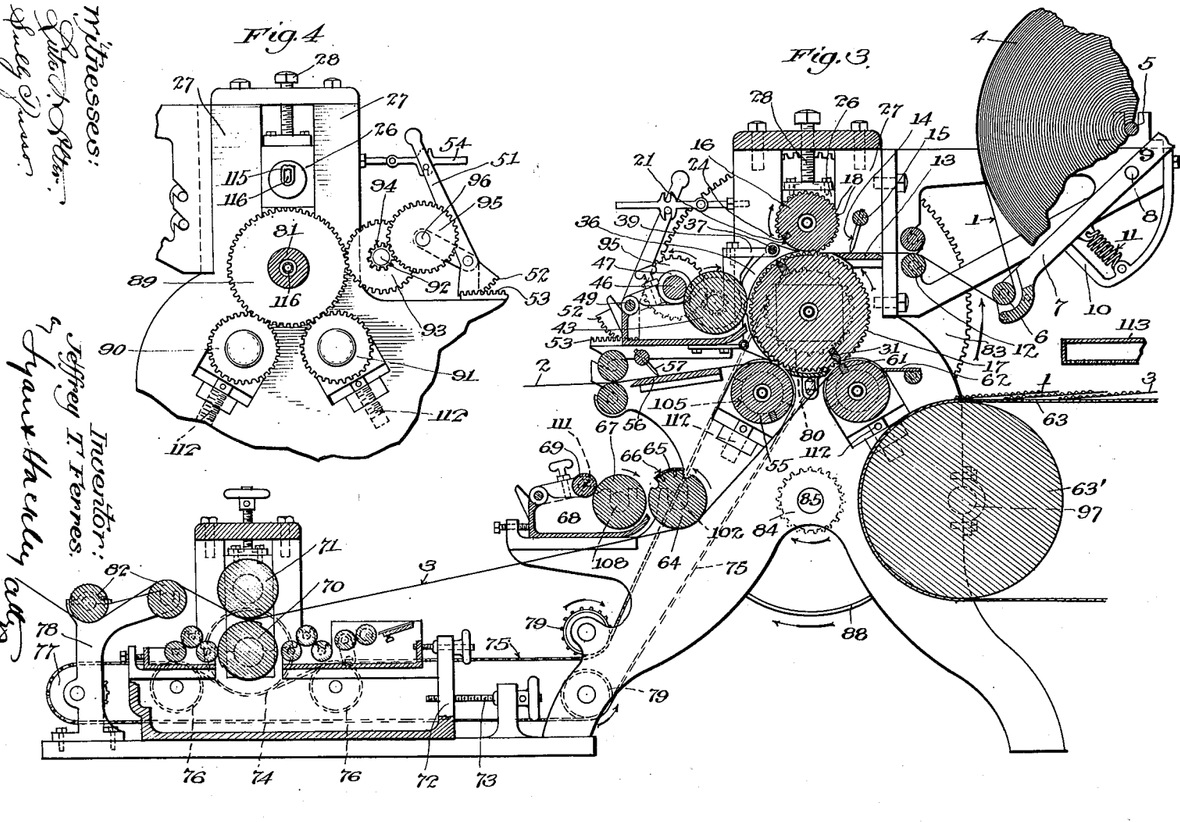
Fig. 3 is a section on line $x^3$—$x^3$, Fig. 2, also showing a printing mechanism.
Fig. 4 is a side elevation of the upper portion of the machine on the side opposite that shown in Fig. 1.

The fly sheet 3 as just explained, is gummed at intervals and this is accomplished by means of the gum roll 64, shown in detail in Fig. 3, which is provided with a projecting gum applying portion 65, the remainder of its circumference having a less diameter and being free from adhesive. The width of the strip of adhesive which is applied to the fly sheet 3 may be varied by varying the width of the projecting gumming portion 65, and to enable this, I have provided a plurality of removable segmental strips 66, see Fig. 12. The gum roll 64 is driven by positive gearing to be described, and the projecting portion 65 is supplied with adhesive from a doctor roll 67, journaled in gum pan 68.

69 is an adjustable gage roll substantially similar to the gage roll 46 previously described.

As the gum roll 64 revolves, its projecting portion receives adhesive from doctor roll 67 and in turn applies this adhesive at intervals to the fly sheet 3 as the latter passes along against it.

If it is desired to print the fly sheet 3 before it is attached, it may be accomplished by the mechanism shown in Fig. 3, in which 70 designates a printing roll against which the strip 3 is held by an impression roll 71. Ink may be applied to the printing roll 70 in any desired manner. The printing mechanism is mounted on a frame 72 which is bodily movable toward and from the main frame of the machine, so as to position the printing with respect to the margins of the fly sheet as determined by the cutting off mechanism. This regulation of the frame 72 may be accomplished by a screw 73. The printing roll 70 is driven by a sprocket 74 shown in dotted lines, Fig. 3, and a chain 75 is guided by two idle sprockets 76 which are carried by the frame 72 which hold the chain in contact with a sufficient portion of the sprocket 74. The chain 75 runs over a sprocket 77 which is journaled in bearings in a stationary bracket 78. The chain 75 also runs over idle sprockets 79 on the main frame of the machine and thence over a sprocket 80 which is mounted on a shaft 81 which carries the lower corrugating roll 17, the sprocket 80 serving to drive the chain 75. By this arrangement the printing mechanism may be moved bodily by the adjustment described, without interrupting the driving relation of the chain 75 which is always kept tight and in mesh with the sprocket 74. The fly sheet 3 first passes over two idle rolls 82 and then passes between the printing roller 70 and impression roll 71, and from there passes to the gum roll 64.

As many wrappers do not require printing, a pin 114 has been provided which is removable from sprocket wheel 80, thus stopping the chain 75 and the whole printing attachment. The sheet 3 may then be drawn between the printing roll 70 and impression roll 71 at a point where there is no type on printing roll 70.

The corrugating rolls 16 and 17 and presser rolls 55 and 60 are hollow and arranged to be heated by steam through the inlet pipes 115 and exhaust pipes 116.

I do not limit myself to providing blank spaces in both rolls 16 and 17, as it is obvious that if the spaces in roll 17 are made deep enough so the teeth in roll 16 if they were left in would not touch the bottom of the blank spaces, the same purpose would be accomplished.

Mounted on the shaft 81 is a gear 83 which is driven by a pinion 84 on the driving shaft 85, which is mounted at one side of the main frame in bearings 86 and 87. 88 is a pulley on shaft 85 for driving the same; also mounted on the shaft 81 is a gear 89 which meshes on its lower side with two gears 90 and 91, which respectively drive rolls 60 and 55. The adhesive roll 43 is mounted on a shaft 92 carrying a gear 93, which is driven from gear 89, see Figs. 2 and 4. Also on the shaft 92 is a pinion 94 which drives a gear 95 which is mounted on shaft 96, carrying the gage roll 46.

The drum 63' which carries the drying belt 63 is mounted on a shaft 97 which has a sprocket 98 driven by a chain 99 from a small sprocket 100 mounted on a shaft 101, which carries the upper corrugating roll 16.

Figure 1:
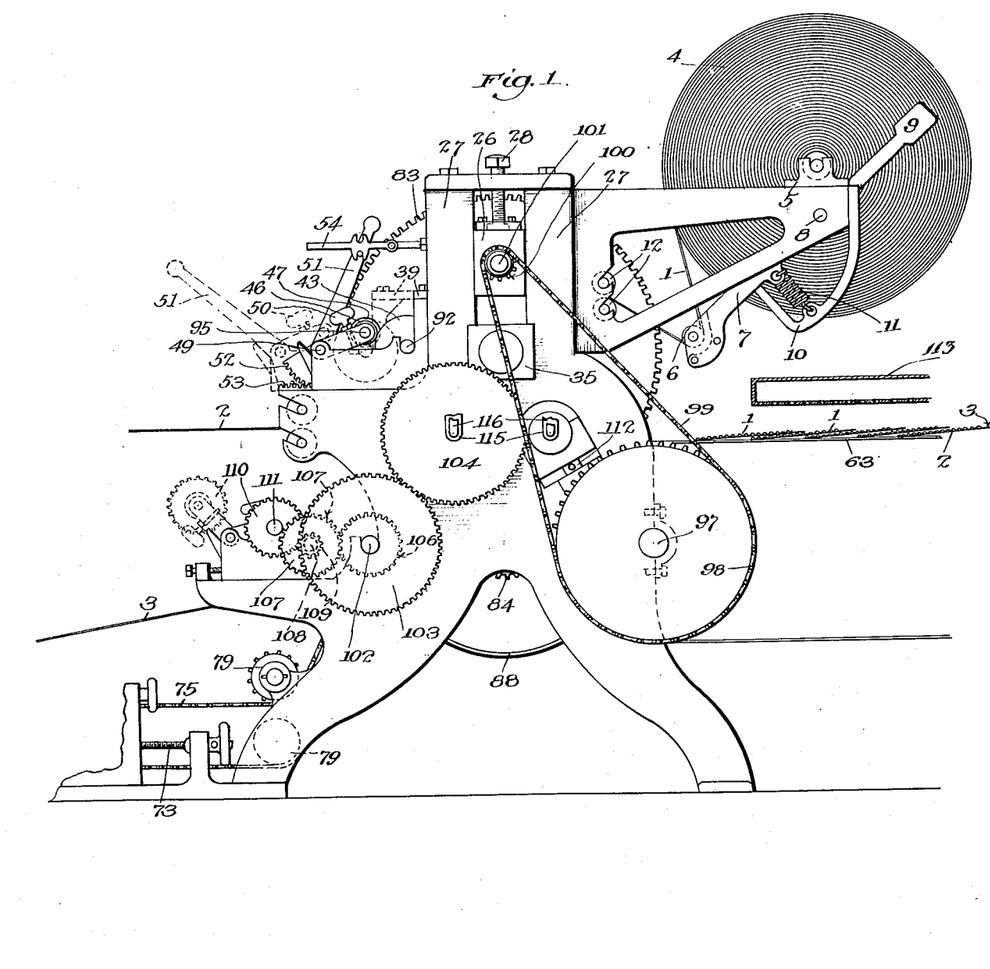
Figure 1 is a side elevation of the machine.
Figures 2, 14:
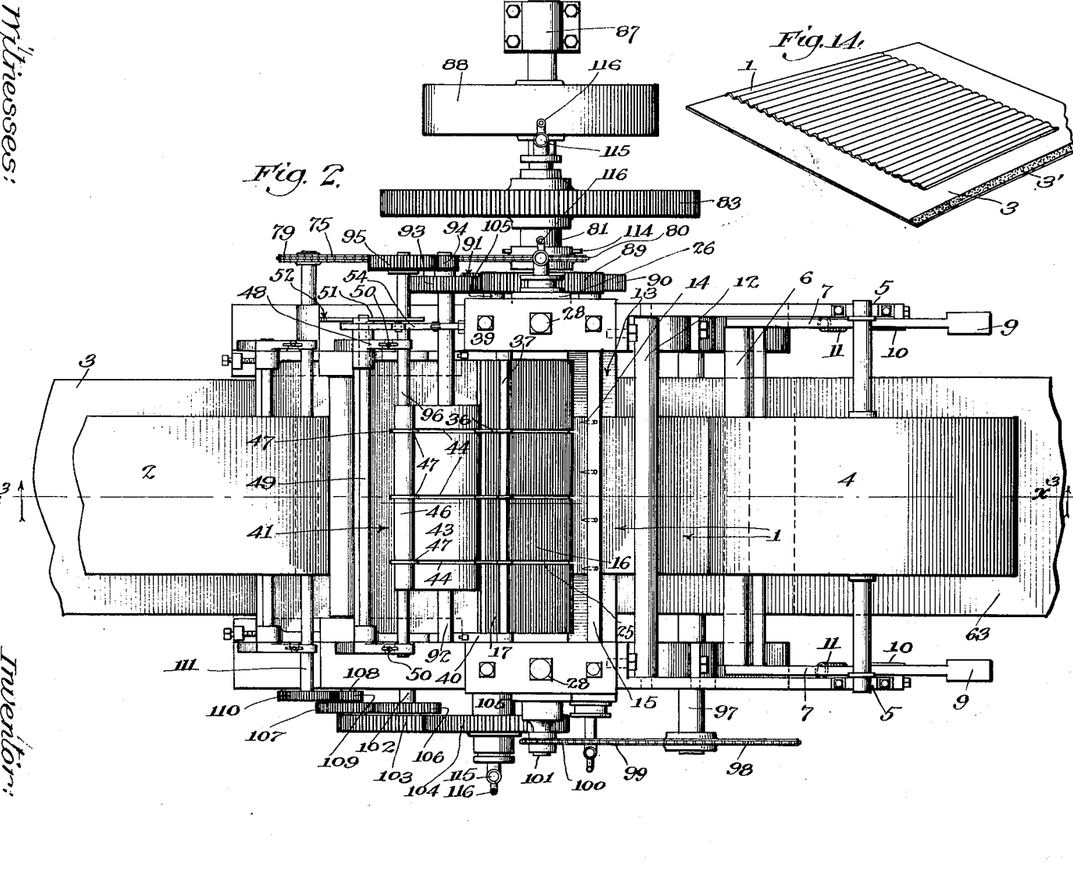
Fig. 2 is a plan view.
Fig 14 is a perspective of a complete wrapper of another form in which the fly sheet takes the place of the backing sheet. In this form the fly sheet which takes the place of the backing sheet is longer than the corrugated sheet to allow it to lap thereover and be attached at its edge to secure the package.

The gum roll 64 is mounted on a shaft 102 which carries a gear 103, see Figs. 1 and 2, which meshes with a gear 104 which is mounted on shaft 105, which carries the presser roll 55. Also mounted on shaft 102 is a gear 106 which meshes with a gear 107 on a shaft 108, which carries the doctor roll 67. Also mounted on shaft 108 is a pinion 109 meshing with a gear 110 on a shaft 111, which carries the gage roll 69. By this gearing the gum roll 64 and doctor roll 67 are driven at the same speed to properly transfer gum from the doctor roll to the gum roll, and their peripheral speed is the same as the rate of travel of the fly sheet 3, so that the gum roll will properly transfer the gum thereto, while the gage roll 69 is driven at a slower speed in order to make a uniform distribution of the gum on the doctor roll 67, by causing a slippage between the surfaces.

The following is a brief description of the operation: In making the wrapper shown in Fig. 13, consisting of corrugated sheet 1, backing sheet 2 and fly sheet 3, with a gummed edge 3', the corrugated sheet is fed intermittently by the intermeshing teeth of the two corrugating rolls 16 and 17, the interruption of travel of the sheet being produced by the plain surfaces 21 and 29 which comes directly after the sheet is severed by the knife 31 against anvil 24 of the corrugating rolls. The corrugating rolls are in constant mesh with each other and the blank spaces thus cause a definite pause in the travel of the corrugated sheet 1. The outer projecting corrugations of the corrugated sheet are supplied with adhesive from the adhesive roll 43 by a springing out movement of the corrugated paper from the lower corrugating roll 17, which is permitted by the concave spaces 42 in guides 36, the tendency of the sheet being to spring away from the corrugating roll, and after a further short travel these projecting corrugations having adhesive on them, are brought into contact at the presser roll 55 with the backing sheet 2, the latter being fed by the presser roll 55 traveling in contact with roll 17 and at the same surface speed of travel as the corrugated sheet, the two sheets traveling together and being united by the adhesive, the backing sheet is severed by the knife that previously severed the corrugated sheet when the knife reaches the anvil 59 in roll 55, and the corrugated sheet with the backing sheet thus united to it, passes over the roll 60, together with the fly sheet 3 underneath it, and while thus passing over the roll 60, these united sheets all travel at the same speed, but the fly sheet during a definite distance of travel in contact with the backing sheet, does not become united with the backing sheet, because there is no gum on the fly sheet except at intervals, and when this definite travel has taken place, the gummed portion of the fly sheet comes into contact with the backing sheet and it unites the backing sheet therewith by pressure from roll 60, and the same knife in the lower corrugating roll that severed the other two sheets severs the fly sheet. The securing of the fly sheet to the backing sheet is accomplished at a point just in advance of the severing action of the knife. The area of the fly sheet 3 which is supplied with gum is of such width and so positioned that the knife severs the fly sheet through substantially the center of the gummed area, whereby each fly sheet has a gummed strip at each end thereof and that gummed strip which is at the rear edge is the gummed portion which is employed in fastening the fly sheet to the backing sheet, while the gummed portion at the other end is allowed to dry and is to be employed later when the wrapper is to be placed around the package. It is not always desired to construct the wrapper with the gummed edge to be used in wrapping, and when a plain edge is desired, the width of the gummed area imparted to the fly sheet is reduced, so that the knife will cut at the rear edge of the gummed portion. This reduction in width may be produced by removing one of the plates 66, see Fig. 12.

The reason for imparting the intermittent movement to the corrugated sheet is to permit the fly sheet 3 to move forward during the interrupted movement of the corrugated sheet and backing sheet, and thereby provide the extending side margin of the wrapper. As before explained, this extended side margin may be either gummed or plain. The length of this margin may be varied by removing one or more of the removable teeth 19 and 30 of the corrugating rolls 16 and 17, to decrease the width of the corrugated and backing sheets to fit smaller packages.

Where it is desired to construct the wrapper without the backing sheet 2, the roller 55 is dropped back slightly from roll 17 by means of the screws 112 under its bearings, and the backing sheet is omitted and not fed into the machine. It is obvious that then the projecting portions of the corrugated sheet which are all supplied with adhesive will be affixed to the fly sheet in passing over the roll 60. The projecting side margin of the fly sheet will project as before, but the remaining portion of the fly sheet except its extending edges will be secured by the adhesive to the projecting corrugations of the corrugated sheet.

As the wrappers are deposited on the drying belt 63 as previously explained, they are caused to overlap each other with only the projecting side portion of the fly sheet exposed. This is because the surface speed of the drying belt is much slower than surface speed of the corrugating rolls and to dry the gum on the fly sheets quickly, I provide an air pipe 113 which may be of whatever length the drying belt is and provided with holes in its under surface for the escape of air, and supplied with air from any suitable source.

As the backing sheet 2 travels intermittently it can be supplied with the roll 6, frame 7, bracket 10 and spring 11, the same as shown for the corrugated sheet 1, although the need is not so great because the sheet 1 travels faster off the roll supply than sheet 2, because it is taken up by the corrugations.

I do not limit myself to constructing presser rolls 55 and 60 as shown, as it is obvious that they could be constructed of chilled cast iron or hardened steel, in which case no anvils as shown, would be needed, neither would the circumference of the rolls have to be any multiple of the fly sheet, but could be larger or smaller, as desired. The construction shown, however, would be the cheapest to manufacture.

What I claim is:

1. In a machine for making wrappers, means for corrugating a sheet, and means for attaching a sheet of greater length than the corrugated sheet to the corrugated sheet, leaving a free portion of the sheet at one end thereof unattached to the corrugated sheet.

2. In a machine for making wrappers, means for corrugating a sheet, and means for attaching a sheet of greater length than the corrugated sheet to the corrugated sheet, leaving a free portion of the sheet at one end thereof unattached to the corrugated sheet, and means for applying gum to a part of said free portion.

3. In a machine for making wrappers, means for corrugating a sheet, means for attaching a backing sheet to the corrugations of the corrugated sheet, and means for attaching a fly sheet at one edge to the backing sheet.

4. Means for corrugating a sheet, means for attaching a backing sheet, means for applying gum to a fly strip, means for cutting said strip through the gummed portion to form a fly sheet with gum at each end thereof, and means for attaching one of the gummed ends of the fly sheet to the backing sheet.

5. Means for feeding a fly sheet, means for corrugating a sheet and feeding the corrugated sheet into conjunction with the fly sheet, and producing a difference in the rate of travel between the two sheets to bring the forward edge of the corrugated sheet at a distance in the rear of the forward edge of the fly sheet, and means for securing the sheets together.

6. Means for feeding a fly sheet, means for corrugating a sheet and feeding the corrugated sheet into conjunction with the fly sheet, and producing a difference in the rate of travel between the two sheets to bring the forward edge of the corrugated sheet at a distance in the rear of the forward edge of the fly sheet, means for securing the sheets together, means for attaching a backing sheet to the corrugated sheet, and means for securing the rear edge of the fly sheet to the backing sheet.

7. Means for corrugating a sheet, means for feeding a fly sheet into conjunction with the corrugated sheet, means for applying gum to a portion of the fly sheet, means for cutting said fly sheet at a definite point, and means for varying the position of the gum with respect to the cutting means.

8. Means for corrugating a sheet, means for feeding a fly sheet into conjunction therewith, means for applying gum at a definite point on said fly sheet, and means for varying the width of the strip of gum applied to the fly sheet.

9. Means for feeding a strip with an intermittent movement, means for corrugating the said strip, and means for feeding a fly sheet with an uninterrupted movement for adapting the same to the corrugated sheet.

10. Means for feeding a sheet with an intermittent movement, means for corrugating said sheet, means for securing a backing sheet to the corrugations of the corrugated sheet, and means for feeding a fly sheet with a continuous movement and securing one edge of it to the backing sheet.

11. Means for feeding a sheet with an intermittent movement, a tension roll under which said sheet passes, and adapted to yield to the sudden intermittent movement of the sheet, means for corrugating the sheet, and means for attaching a fly sheet to the corrugated sheet.

12. In a machine for making wrappers, corrugating rolls having corrugations, a relatively small portion of the surface area of a roll having the corrugations cut away near the center and a knife at the edge of said cutaway portion.

13. In a machine for making wrappers, corrugating rolls having corrugations, a relatively small portion of the surface area of a roll having the corrugations cut away near the center, the corrugations at the end being around the entire circumference, and the corrugated rolls meshing together uninterruptedly at the ends.

14. In a machine for making wrappers, two corrugating rolls, one larger than the other, the diameter of the larger roll being a multiple of the diameter of the smaller roll, the smaller roll having a portion of its corrugations cut away, the larger roll having its corrugations cut away at a number of points, corresponding in number to said multiple and knives in the larger roll at one side of the cutaway portions.

15. In a machine for making wrappers, corrugating rolls, the surface of which at the ends is corrugated around the entire circumference, and a portion of the periphery of the rolls near the center, not corrugated, a hardened steel anvil strip inlaid in the surface of one of the rolls, and a knife carried by the other roll and coacting with the anvil.

16. In a machine for making wrappers, corrugating rolls with segmental cutaway portions, guides extending partially around one of said rolls, the upper ends of the guides being extended into the upper roll, the upper roll having segmental circumferential grooves in the uncut portions to receive the guides, said guides being independently adjustable to or from the rolls.

17. In a machine for making wrappers, corrugating rolls, the surface of which at the ends is corrugated the entire periphery, and portions of the rolls near the center not corrugated, and the circumference of the upper roll being the same as the mid-width of the fly sheet of the wrapper.

18. In a machine for making wrappers, corrugating rolls, the surface of which at the ends is corrugated the entire periphery and portions of the rolls near the center not corrugated, the circumference of the upper roll being the same as the mid-width of the fly sheet of the wrapper, and the circumference of the lower roll being any multiple of the width of the fly sheet of the wrapper.

19. In a machine for making wrappers, corrugating rolls, the surface of which at the ends is corrugated the entire periphery and portions of the rolls near the center not corrugated, the circumference of the upper roll being the same as the mid-width of the fly sheet of the wrapper, the circumference of the lower roll being any multiple of the width of the fly sheet of the wrapper, and means for adjusting the distance between the two corrugating rolls.

20. In a machine for making wrappers, two corrugating rolls, one of which is provided with a knife in the surface and extending parallel with the corrugations, and the other roll being provided with a hardened steel anvil inlaid in the surface and parallel with the corrugations, the relative speed of rotation of the two rolls being such that the knife of the first mentioned roll will act against the anvil in the other roll.

21. In a machine for making wrappers, two corrugating rolls, one of which is provided with a knife in the surface and extending parallel with the corrugations, the other roll being provided with a hardened steel anvil inlaid in the surface and parallel with the corrugations, the relative speed of rotation of the two rolls being such that the knife of the first mentioned roll acts against the anvil in the other roll, and means for forcing the knife out from the center of the roll.

22. In a machine for making wrappers, two corrugating rolls, one of said rolls having a portion of its corrugations cut away near the center and having corrugations around its complete periphery at the ends, and a plain roll in rolling contact therewith for pressing another sheet against the sheet which is on one of the corrugating rolls.

23. In a machine for making wrappers, two corrugating rolls, one of said rolls having a portion of its corrugations cut away near the center, knives inlaid in one of the corrugated rolls, a plain roll in rolling contact therewith for pressing another sheet against the sheet which is on one of the corrugating rolls, and a hardened steel anvil inlaid in the surface of the plain roll for the knives in the corrugating roll to cut against.

24. In a machine for making wrappers, two corrugating rolls, one of said rolls having a portion of its corrugations cut away near the center, a plain roll in rolling contact therewith for pressing another sheet against the sheet which is on one of the rolls, a hardened steel anvil inlaid in the surface of the plain roll, and a steel knife inlaid in the corrugated roll and adapted to coact with the anvil in the plain roll.

25. In a machine for making wrappers, corrugating rolls, a paper carrying roll, a frame supporting said roll, a spring controlled frame on said supporting frame, an idler roll on the spring controlled frame around which idler roll the paper from the paper roll is carried, a plate over which the paper passes, means for cutting the paper, and means for checking the recoil of the paper when cut.

26. In a machine for making wrappers, corrugating rolls, a paper carrying roll, a frame supporting said roll, a spring controlled frame on said supporting frame, an idler roll on the spring controlled frame around which idler roll the paper from the paper roll is carried, a plate over which the paper passes, means for cutting the paper, and check points supported at an angle with their lower ends resting on the paper for checking the recoil of the paper when cut off.

27. In a machine for making wrappers, two corrugating rolls, the surfaces of which are corrugated the entire periphery at the ends, with portions of the rolls removed near the center, a plain roll bearing against one of the corrugated rolls, and paste applying means for applying paste to the paper corrugated by the corrugating rolls.

28. In combination with corrugating rolls for corrugating a sheet, guides for guiding a backing sheet toward the corrugating sheet, check points engaging the backing sheet to prevent recoil when cut off, and a plain roll for pressing the backing sheet against the corrugated sheet.

29. In a machine for making wrappers, two corrugating rolls, the surfaces of which are corrugated at the ends around their entire peripheries, with an intermediate portion of the corrugations cut away, plain rolls in rolling contact with the lower corrugating roll, and means for adjusting said plain rolls toward and from the corrugating roll.

30. Means for corrugating a sheet, means for feeding a fly sheet to the corrugated sheet, a gum roll for applying gum to the fly sheet, and said gum roll having a removable segmental gum applying surface for applying gum to said fly sheet.

31. In a machine for making wrappers, corrugating rolls with a portion of the surface cut away at the center and having corrugations around the complete periphery at both ends, guides extending partly around one of said rolls, the upper roll having circumferential grooves to receive the ends of the guides.

32. In a machine for making wrappers, corrugating rolls with a portion near the center not corrugated with corrugations around the complete peripheries at both ends, in combination with a plain roll in rolling relation therewith.

33. In a machine for making wrappers, corrugating rolls having a portion near the center not corrugated with corrugations around the complete peripheries at both ends, in combination with a plain roll in rolling relation therewith, and means for introducing steam to said rolls to heat them.

34. Means for corrugating a sheet, means for feeding a fly sheet into conjunction therewith, means for applying gum at a definite point on said fly sheet, and adjustable means for printing the fly sheet before the gum is applied.

35. In a machine for making wrappers, two corrugating rolls, the surfaces of which are corrugated at the ends around their entire peripheries, and one of which has a portion of its surface cut away near the middle, plain rolls in rolling contact with the lower corrugating roll, a drying belt, and a perforated air pipe extending over the top surface of the drying belt.

36. In a machine for making wrappers corrugating rolls with cutaway portions and having removable teeth at one side of the cutaway portions for the purpose of varying the length of the corrugated sheet.

In testimony whereof, I have hereunto set my hand at Los Angeles, California this 13th day of January, 1914.

JEFFREY T. FERRES.

In presence of—
  A. T. HACKLEY,
  LORRAINE E. DURROW.